United States Patent
Fujie et al.

(10) Patent No.: US 6,602,111 B1
(45) Date of Patent: Aug. 5, 2003

(54) ABRASIVE

(75) Inventors: Yoshinori Fujie, Kanagawa (JP); Sumihisa Yamaguchi, Kanagawa (JP)

(73) Assignee: Seimi Chemical Co., Ltd., Chigasaki (JP)

(*) Notice: Subject to any disclaimer, the term of this patent is extended or adjusted under 35 U.S.C. 154(b) by 204 days.

(21) Appl. No.: 09/617,287

(22) Filed: Jul. 14, 2000

(51) Int. Cl.$^7$ .................................................. B24B 1/00
(52) U.S. Cl. ............................ 451/36; 451/41; 451/59; 451/60; 451/63
(58) Field of Search ........................ 51/307, 309; 451/36, 451/41, 42, 59, 60, 63; 216/88, 89; 438/692, 693

(56) References Cited

U.S. PATENT DOCUMENTS

| | | | | |
|---|---|---|---|---|
| 5,527,423 A | * | 6/1996 | Neville et al. | 51/308 |
| 5,759,917 A | * | 6/1998 | Grover et al. | 51/309 |
| 6,221,118 B1 | * | 4/2001 | Yoshida et al. | 51/307 |
| 6,238,450 B1 | * | 5/2001 | Garg et al. | 51/309 |
| 6,280,489 B1 | * | 8/2001 | Horie et al. | 51/307 |
| 6,293,848 B1 | * | 9/2001 | Fang et al. | 451/36 |

OTHER PUBLICATIONS

U.S. patent application Ser. No. 09/061,059, filed Apr. 16, 1998.*

U.S. patent application Ser. No. 09/532,863, filed Mar. 22, 2000.*

* cited by examiner

*Primary Examiner*—Timothy V. Eley
(74) *Attorney, Agent, or Firm*—Oblon, Spivak, McClelland, Maier & Neustadt, P.C.

(57) ABSTRACT

An abrasive for planarization of glass substrates for hard discs comprising abrasive grains mainly composed of rare earth oxides containing cerium oxide, wherein the abrasive grains has a cerium oxide/total rare earth oxide ratio of 95 wt %.

18 Claims, No Drawings

ABRASIVE

BACKGROUND OF THE INVENTION

1. Field of the Invention

The present invention relates to an abrasive containing cerium oxide as abrasive grains suitable for polishing glass substrates for hard discs.

2. Discussion of Background

The hard disc is a typical nonvolatile external memory currently used in personal computers for its large capacity, small size and low price, and programs such as OS and application software are usually stored in it after installation and invoked to the main memory such as DRAM to operate anytime where necessary.

A hard disc consists of a substrate, which is conventionally made of aluminum or glass, and a magnetic coating formed on the substrate. On the other hand, the average capacity of hard discs for ordinary personal computers has increased from several hundred megabytes to several to over ten gigabytes recently due to the increase of so-called multi-media information containing images and sounds delivered via the Internet and the diversification and sophistication of application software into OS and CAD, CAM and photo retouching software in recent years, and the trend toward high density is not only continuing but also accelerating.

High density recording requires that the distance (space) between the magnetic head and the disc rotating at high speed, or the flying height of the head, is minimized, for example, to 0.15 µm or below. Consequently, substrates with a high level of surface smoothness are necessary for hard disc which rotate at high speed in view of strength and flying height.

Because thinner substrates are required for high density recording especially in recent years, glass substrates are predominantly used for their strength. In production of glass substrates for hard discs, a higher grade of polishing is required to improve surface smoothness.

Typical abrasives for glass in current use usually contain mixtures of cerium oxide and other rare earth oxides as abrasive grains.

However, cerium abrasives with low cerium contents obtained from low purity bastnaesite essentially have a problem that the radioactive substances and fluorine in the raw material contaminate the environment when they are used or disposed of. Being mixtures with other rare earth elements, such abrasives do not have fixed compositions and therefore problematically vary in polishing performance.

Further, abrasives with low cerium contents have a problem that they do not achieve the required improvement in profile irregularity of glass substrates. Specifically speaking, use of a low purity rare earth mixture as abrasive grains in an attempt for higher surface smoothness produces the problems of decrease in polishing power and adhesion of abrasive grains to the glass surface, according to extensive research by the present inventors.

For these reasons, an excellent abrasive which is suitable for polishing glass substrates for hard discs and attains improvement in surface smoothness is demanded.

SUMMARY OF THE INVENTION

The object of the present invention is to provide an abrasive of stable quality which imparts a high level of smoothness to glass substrates for hard discs under polishing without decrease in polishing power.

The present invention solves the above-mentioned problems by providing (1) an abrasive for planarization of glass substrates for hard discs comprising abrasive grains mainly composed of rare earth oxides containing cerium oxide, wherein the abrasive grains has a cerium oxide/total rare earth oxide ratio of 95 wt %.

The present invention solves the above-mentioned problems also by providing (2) a polishing method for planarization of glass substrates for hard discs, which comprises polishing a glass substrate for a hard disc with a polishing cloth while supplying the abrasive to the polishing cloth.

The abrasive of the present invention comprises high purity cerium oxide having a cerium oxide/total rare earth oxide ratio of at least 95 wt % as the abrasive grains.

Namely, the abrasive is characterized by comprising abrasive grains (hereinafter referred to as the abrasive grains of the present invention) made of high purity cerium oxide which has a cerium oxide content, in relation to the total rare earth oxide content (hereinafter referred to as TREO), of at least 95 wt %.

In the present invention, the abrasive grains are preferably made of high purity cerium oxide having a cerium oxide/ total rare earth oxide ratio of at least 95 wt %, preferably at least 98 wt %, more preferably at least 99 wt %. The contents of radioactive substances such as uranium and thorium are preferably at most 0.01 wt %, respectively, and the fluorine content of the abrasive grains is preferably at most 1 wt %, more preferably at most 0.1 wt % for less adverse effect on the environment.

The abrasive grains used in the present invention may be those obtained known production processes on the market but are obtainable by calcining commercially available high purity cerium carbonate as well. They are also obtainable from bastnaesite or the like after refinement and calcination.

For example, the abrasive grains are obtainable by dissolving roasted bastnaesite or monazite in nitric acid, roasting the resulting precipitate after separation, dissolving the resulting rare earth oxide in nitric acid again, extracting the cerium ion from the aqueous phase into a solvent such as tributyl phosphate-benzene as an organic phase, extracting the cerium ion back into an aqueous phase containing a reducing agent such as sodium nitrite in the form of cerium oxalate and calcining the cerium oxalate.

As the starting material, high purity cerium carbonate with high cerium purity obtained by removing impurities such as other rare earth elements and fluorine from rare earth complex ore by using various separation and extraction techniques may also be used similarly and preferred.

The purity of typical such high purity cerium carbonate is as follows.

Cerium/total rare earth ratio=99.0 wt %

(Uranium+thorium) <0.01 wt % fluorine <0.1 wt %

The analytic methods used are as follows.

① Cerium oxide and rare earth: fluorescent X-ray spectrometry

② Thorium and uranium: inductively coupled plasma (ICP) emission spectrometry

③ Fluorine: absorptiometry

Cerium oxide with high purity is readily obtainable from high purity cerium carbonate as the starting material upon heating (calcination) in the air.

The cerium oxide/total rare earth oxide ratio of the calcination product is substantially the same as the cerium/total rare earth ratio of the cerium carbonate as the starting material. The resulting cerium oxide is in the form of the trivalent or the tetravalent oxide, depending on the calcination conditions. The calcination temperature is appropriately selected according to the properties of the glass to be polished and preferably from 500 to 1100° C., particularly preferably from 600 to 1000° C. The calcination temperature particularly preferable for improved smoothness of the polished surface is from 750 to 850° C.

The particle size of the abrasive grains of the present invention is appropriately selected in view of the intended polishing power and surface smoothness and can be controlled by pulverization before or after calcination. Those having a particle size within a desired range are obtainable by wet classification using a hydrocyclon, a centrifugal settler or a centrifugal decanter.

The average particle size of the abrasive grains of the present invention is preferably from 0.2 to 6 μm, in particular from 0.5 to 4 μm. An average particle size smaller than 0.2 μm tends to result in lower polishing power, and an average particle size larger than 6 μm tends to result in increase of scratches.

In the present invention, the average particle size is the particle size at which the cumulative size distribution curve on a mass basis reaches 50% in relation to the total mass and also referred to as the mass basis cumulative 50% particle size (see e.g. Chemical Engineering Handbook, 5th edition, compiled by the Society of Chemical Engineering, Japan, pp.220–221).

For determination of the average particle size, the particle size distribution is determined, for example, by using an instrument such as Microtrack HRAX-100, manufactured by Nikkiso Co., Ltd. with a stable dispersion obtained by dispersing cerium oxide particles in a medium such as water by sonication.

The abrasive of the present invention is preferably used in the form of a slurry (hereinafter referred to as an abrasive slurry) containing from 1 to 40 wt %, preferably from 5 to 30 wt %, of high purity cerium oxide as the abrasive grains formed by thoroughly dispersing the abrasive grains in water or an aqueous medium (hereinafter referred to as "an aqueous-type medium" collectively) by an agitation mixer, a homogenizer or a ball mill. An aqueous medium means a solvent mixture containing water as the base and at most 30 wt %, preferably at most 20 wt %, of a water-soluble or water-miscible organic solvent such as methanol, ethanol or isopropanol. Into the abrasive slurry, a dispersant, a thickener, a fungicide, an oxidizing agent or a pH regulator may be incorporated suitably according to the intended use.

As a dispersant, a surfactant is usually used, and an anionic surfactant poly(ammonium acrylate), poly(sodium acrylate), ammonium oleate, ammonium lauryl sulfate or triethanolamine lauryl sulfate, a nonionic surfactant such as polyoxyethylene lauryl ether, polyoxyethylene sorbitan monolaurate or polyethylene glycol distearate is preferably used.

The abrasive slurry of the present invention may contain at most 50 wt %, preferably at most 30 wt %, of other abrasive grains of one or more species selected from alumina, silica, zirconia, titania and germania, preferably from alumina, silica and zirconia, in relation to the abrasive grains of the present invention.

In the polishing method of the present invention, a glass substrate is polished by a polishing machine such as a single-ended polishing machine or a double-ended polishing machine while the abrasive of the present invention is supplied, usually in the form of a slurry, to the polishing cloth of the polishing machine. The polishing using the abrasive slurry is carried out by a conventional method, for example, by rotating and sliding an upper and a lower platen each having a polishing pad of non-woven fabric or polyurethane foam (a polishing cloth) attached to the surface along a glass substrate to be polished held between the platens while supplying the abrasive slurry to between the platens and the glass substrate so that the abrasive is pressed against the substrate by the polishing pads at a certain pressure. The abrasive slurry supplied is supposed to be held on the polishing pads during the polishing.

In general, the polishing pressure is from 30 to 150 g/cm$^2$, preferably from 50 to 120 g/cm$^2$, the rotational speed of the platens is from 10 to 80 rpm, preferably from 30 to 60 rpm, and the polishing rate for a glass substrate is from 0.05 to 3 μm/min, preferably from 0.1 to 1 μm/min.

The mechanism which accounts for the high level of surface smoothness of glass substrates polished with the abrasive of the present invention has not fully elucidated yet at present and but is presumably described as follows. The abrasive grains in the abrasive of the present invention are made of high purity cerium oxide containing very little other rare earth elements as impurities, which hardly have polishing power against glass and therefore lower the overall polishing power.

Because the abrasive grains in the abrasive of the present invention are mainly composed of cerium oxide, which has great polishing power against glass, the abrasive has considerably high polishing power as a whole. Therefore, cerium oxide obtained from cerium carbonate upon calcination, though they are less hard than conventional polishing grains, as the polishing grains seems to impart satisfactory overall polishing power to the abrasive. Even if cerium oxide having small particle sizes obtained by pulverization followed by classification is used as abrasive grains, The abrasive still has satisfactory polishing power as a whole.

This may be the reason why the abrasive of the present invention can impart a higher level of surface smoothness to the polished glass than conventional cerium oxide abrasives despite its comparable polishing power.

Now, the present invention will be described in further detail with reference to Examples. However, it should be understood that the present invention is by no means restricted to such specific Examples. In the following description, "%" means "wt %".

(I) Preparation of Abrasive Slurries

EXAMPLE 1

Cerium carbonate having a cerium/total rare earth ratio of 99.0% was pulverized by a dry method with a jet mill and calcined at 700° C. The calcination product was classified by a wet method to give abrasive grains having an average particle size of 1.2 μm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%. The TREO analysis was carried out in accordance with JIS M8404-1976 through the Examples.

EXAMPLE 2

Cerium carbonate having a cerium/total rare earth ratio of 99.0% was pulverized by a dry method with a jet mill and calcined at 750° C. The calcination product was classified by a wet method to give abrasive grains having an average particle size of 1.2 µm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%.

EXAMPLE 3

Cerium carbonate having a cerium/total rare earth ratio of 99.0% was calcined at 700° C. The calcination product was pulverized by a dry method with a jet mill and classified by a wet method to give abrasive grains having an average particle size of 1.1 µm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%.

EXAMPLE 4

Cerium carbonate having a cerium/total rare earth ratio of 99.0% was calcined at 750° C. The calcination product was pulverized by a dry method with a jet mill and classified by a wet method to give abrasive grains having an average particle size of 1.1 µm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%.

EXAMPLE 5

Cerium carbonate having a cerium/total rare earth ratio of 99.0% was calcined at 800° C. The calcination product was pulverized by a dry method with a jet mill and classified by a wet method to give abrasive grains having an average particle size of 1.1 µm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%.

EXAMPLE 6

Cerium carbonate having a cerium/total rare earth ratio of 99.0% was calcined at 850° C. The calcination product was pulverized by a dry method with a jet mill and classified by a wet method to give abrasive grains having an average particle size of 1.1 µm. They were dispersed in deionized water to give an abrasive slurry having an abrasive content of 10%.

The abrasive grains were found to have a cerium oxide/TREO ratio of 99.0%, a fluorine content of less than 0.1% and a radioactive substance (uranium+thorium) content of less than 0.01%.

COMPARATIVE EXAMPLE 1

Three lots of rare earth-containing cerium carbonate (from different lots of bastnaesite) having a cerium/total rare earth ratio of 55.0% were pulverized by a dry method with a jet mill and calcined at 800° C. The calcination products were classified by a wet method to give abrasive grains having an average particle size of 1.1 µm. They were dispersed in deionized water to give abrasive slurries having an abrasive content of 10%.

The abrasive grains were found to have a cerium oxide/TREO ratio of 55.0%, a fluorine content of 6.0% and a radioactive substance (uranium+thorium) content of 0.1%.

(II) Polishing Test 1

The abrasive slurries obtained in Examples 1, 2 and 4 and Comparative Example 1 were examined for polishing rate and surface smoothness by the following methods.

① Method for the polishing test

Polishing pressure: 100 g/cm$^2$

Polishing pad: Seagull 25-0 manufactured by Chiyoda Corporation

Polishing machine: NF-300 by Nanofactor

Rotational speed: upper platen 40 rpm lower platen 60 rpm

Slurry feed rate: 24 g/min

Object to be polished: glass substrates for hard discs

② Measurement of the polishing rate

Glass substrates were polished for 10 minutes under the above-mentioned conditions, and the differences in mass between before and after the polishing were measured and expressed in relation to the difference in mass for the abrasive obtained in Comparative Example 1 (the average of the three lots).

③ Evaluation of surface smoothness

Areas of 10 µm×10 µm on the surfaces of the glass polished substrates were scanned by a scanning probe microscope SPI3800N manufactured by SEIKO for measurement of the average roughness in accordance with JIS (B0601), and the Ra values were compared.

The test results are shown in Table 1.

TABLE 1

| | Cerium oxide/ TREO (%) | Fluorine content (%) | Radioactive substance content (%) | Relative polishing rate | Surface smoothness Ra (nm) |
|---|---|---|---|---|---|
| Ex. 1 | 99.0 | <0.1 | <0.01 | 107 | 0.25 |
| Ex. 2 | 99.0 | <0.1 | <0.01 | 115 | 0.20 |
| Ex. 3 | 99.0 | <0.1 | <0.01 | 105 | 0.26 |
| Comp. Ex. 1 | 55.0 | 6.0 | 0.1 | 95–105 | 0.38–0.45 |

(III) Polishing Test 2

The abrasive slurries obtained in Examples 3 to 6 and Comparative Example 1 (three lots) were examined for polishing rate and surface smoothness by the following methods.

① Method for the polishing test

Polishing pressure: 100 g/cm$^2$

Polishing pad: Polytex DG manufactured by Speedfam

Polishing machine: 32GPAW manufactured by Speedfam

Rotational speed: upper platen 35 rpm lower platen 40 rpm

Slurry feed rate: 500 g/min

Object to be polished: glass substrates for hard discs

② Measurement of the polishing rate

Glass substrates were polished for 30 minutes under the above-mentioned conditions, and the differences in mass between before and after the polishing were measured and expressed in relation to the difference in mass for the abrasive obtained in Comparative Example 1 (the average of the three lots).

③ Evaluation of the surface smoothness

Areas of 10 μm×10 μm on the surfaces of the glass substrates were scanned after polishing by a scanning probe microscope SPM-9500J2 manufactured by Shimadzu Corporation for measurement of the average roughness in accordance with JIS (B0601), and the Ra values were compared.

The test results are shown in Table 2.

TABLE 2

| | Cerium oxide/ TREO (%) | Fluorine content (%) | Radioactive substance content (%) | Relative polishing rate | Surface smoothness Ra (nm) |
|---|---|---|---|---|---|
| Ex. 3 | 99.0 | <0.1 | <0.01 | 106 | 0.25 |
| Ex. 4 | 99.0 | <0.1 | <0.01 | 114 | 0.22 |
| Ex. 5 | 99.0 | <0.1 | <0.01 | 118 | 0.18 |
| Ex. 6 | 99.0 | <0.1 | <0.01 | 119 | 0.23 |
| Comp. Ex. 1 | 55.0 | 6.0 | 0.1 | 91–109 | 0.38-0.45 |

The high purity cerium oxide of the present invention is comparable in polishing power with conventional ones as abrasive grains and can impart a high level of surface smoothness to polished glass substrates for hard discs.

Further, it is possible to provide an abrasive of stable quality without variation attributable to difference in the lot of the raw material.

The abrasive of the present invention contains no radioactive substances and no fluorine and does not contaminate the environment when disposed of after polishing.

The abrasive of the present invention is suitably used in polishing glass substrates for optical discs and magnetic optical (MO) discs as well as glass substrates for hard discs.

What is claimed is:

1. A polishing method for planarizing glass substrates for hard discs, which comprises polishing a glass substrate for a hard disc with a polishing cloth while supplying an abrasive comprising abrasive grains comprising rare earth oxides and cerium oxide to the polishing cloth, wherein the abrasive grains comprise at least 95 wt % cerium oxide.

2. The polishing method for planarizing glass substrates for hard discs according to claim 1, wherein the abrasive is supplied to the polishing cloth in the form of a slurry formed by dispersing the abrasive grains in medium comprising water.

3. The polishing method for planarizing glass substrates for hard discs according to claim 2, wherein the slurry comprises 1 to 40 wt % abrasive grains.

4. The polishing method for planarizing glass substrates for hard discs according to claim 2, wherein the slurry comprises 5 to 30 wt % abrasive grains.

5. The polishing method for planarizing glass substrates for hard discs according to claim 2, wherein the slurry further comprises a water-soluble or water-miscible organic solvent.

6. The polishing method for planarizing glass substrates for hard discs according to claim 5, wherein the water-soluble or water-miscible organic solvent is selected from the group consisting of methanol, ethanol, and isopropanol.

7. The polishing method for planarizing glass substrates for hard discs according to claim 2, wherein the slurry further comprises an additive selected from the group consisting of a dispersant, a thickener, a fungicide, an oxidizing agent, and a pH regulator.

8. The polishing method for planarizing glass substrates for hard discs according to claim 7, wherein the dispersant is selected from the group consisting of poly(ammonium acrylate), poly(sodium acrylate), ammonium oleate, ammonium lauryl sulfate, triethanolamine lauryl sulfate, polyoxyethylene lauryl ether, polyoxyethylene sorbitan monolaurate, and polyethylene glycol distearate.

9. The polishing method for planarizing glass substrates for hard discs according to claim 1, wherein the abrasive grains comprise at least 98 wt % cerium oxide.

10. The polishing method for planarizing glass substrates for hard discs according to claim 1, wherein the abrasive grains comprise at least 99 wt % cerium oxide.

11. The polishing method for planarizing glass substrates for hard discs according to claim 1, wherein the abrasive grains comprise at most 0.01 wt % uranium and thorium.

12. The polishing method for planarizing glass substrates for hard discs according to claim 1, wherein the abrasive grains comprise at most 1 wt % fluorine.

13. The polishing method for planarizing glass substrates for hard discs according to claim 1, wherein the abrasive grains comprise at most 0.1 wt % fluorine.

14. The polishing method for planarizing glass substrates for hard discs according to claim 1, wherein the average particle size of the abrasive grains ranges from 0.2 to 6 μm.

15. The polishing method for planarizing glass substrates for hard discs according to claim 1, wherein the average particle size of the abrasive grains ranges from 0.5 to 4 μm.

16. The polishing method for planarizing glass substrates for hard discs according to claim 1, wherein said polishing is carried out at a polishing pressure of 30 to 150 g/cm$^2$.

17. The polishing method for planarizing glass substrates for hard discs according to claim 1, wherein said polishing is carried out at a polishing pressure of 50 to 120 g/cm$^2$.

18. The polishing method for planarizing glass substrates for hard discs according to claim 1, wherein the slurry further comprises other abrasive grains selected from the group consisting of alumina, silica, zirconia, titania, and germania.

* * * * *

UNITED STATES PATENT AND TRADEMARK OFFICE
CERTIFICATE OF CORRECTION

PATENT NO.    : 6,602,111 B1
DATED         : August 5, 2003
INVENTOR(S)   : Fujie et al.

It is certified that error appears in the above-identified patent and that said Letters Patent is hereby corrected as shown below:

Title page,
Item [30], the Foreign Application Priority Data has been omitted.
Item [30] should read:
-- [30]      Foreign Application Priority Data
Jul. 16, 1999   (JP) ……………………….. 11-202974 --

Signed and Sealed this

Twenty-fifth Day of November, 2003

JAMES E. ROGAN
*Director of the United States Patent and Trademark Office*